United States Patent [19]

Ikemori et al.

[11] Patent Number: 5,976,680
[45] Date of Patent: Nov. 2, 1999

[54] NON-FOGGING ANTIREFLECTION FILM AND OPTICAL MEMBER, AND PRODUCTION PROCESS THEREOF

[75] Inventors: Keiji Ikemori; Shoichi Shimura, both of Yokohama; Tohru Yamamoto, Shiga-ken; Shigeo Yoshida, Shiga-ken; Hatsumi Ikari, Shiga-ken, all of Japan

[73] Assignees: Canon Kabushiki Kaisha; Nakato Laboratory, Inc., both of Tokyo, Japan

[21] Appl. No.: 08/733,768

[22] Filed: Oct. 18, 1996

[30] Foreign Application Priority Data

Oct. 20, 1995 [JP] Japan .................................. 7-272998

[51] Int. Cl.$^6$ ........................................................ B32B 7/02
[52] U.S. Cl. ........................ 428/212; 428/333; 428/411.1; 428/446; 428/447; 428/688; 428/913; 428/64.1; 359/581; 359/582; 523/169
[58] Field of Search .................................. 428/64.1, 195, 428/411.1, 688, 913, 446, 447, 451, 522, 523, 212, 333; 359/642, 581, 582; 523/169; 106/13; 427/162, 163.1, 164, 372.2, 387

[56] References Cited

U.S. PATENT DOCUMENTS

| | | |
|---|---|---|
| 3,865,619 | 2/1975 | Pennewiss et al. . |
| 4,026,826 | 5/1977 | Yoshida et al. . |
| 4,029,842 | 6/1977 | Yoshida et al. ........................ 428/334 |
| 4,130,672 | 12/1978 | Onoki et al. ............................ 427/164 |
| 4,852,974 | 8/1989 | Melzig et al. .......................... 350/165 |
| 4,927,239 | 5/1990 | Melzig et al. .......................... 350/165 |
| 4,988,164 | 1/1991 | Ichijawa ................................. 350/165 |
| 5,172,269 | 12/1992 | Ogura et al. ............................ 359/580 |
| 5,181,141 | 1/1993 | Sato et al. ............................... 359/580 |
| 5,580,819 | 12/1996 | Li et al. .................................. 427/167 |
| 5,679,458 | 10/1997 | Cho et al. ............................... 428/412 |

FOREIGN PATENT DOCUMENTS

| | | |
|---|---|---|
| 526975A2 | 2/1993 | European Pat. Off. . |
| 528038A1 | 2/1993 | European Pat. Off. . |
| 578220A2 | 1/1994 | European Pat. Off. . |
| 0716051 | 6/1996 | European Pat. Off. . |
| 1422149 | 1/1976 | United Kingdom . |

OTHER PUBLICATIONS

Patent Abstracts of Japan, vol. 096, No. 001, Jan. 31, 1996, (JP 07 247447).

*Primary Examiner*—Marie Yamnitzky
*Attorney, Agent, or Firm*—Fitzpatrick, Cella, Harper & Scinto

[57] ABSTRACT

An antireflection film is provided which is insoluble, wear-resistant, and weatherable, and simultaneously having non-fogging property. A non-fogging optical member employing the non-fogging antireflection film, and a process for producing the film are also provided. The non-fogging antireflection film is formed from a composition derived by polycondensation of a hydrolyzate of an inorganic alkoxide conducted in the presence of a polyacrylic acid compound.

11 Claims, No Drawings

NON-FOGGING ANTIREFLECTION FILM AND OPTICAL MEMBER, AND PRODUCTION PROCESS THEREOF

BACKGROUND OF THE INVENTION

1. Field of the Invention

The present invention relates to a non-fogging antireflection film, an optical member employing the film, and a process for producing the film.

2. Related Background Art

Many optical members such as lenses, mirrors, and prisms are required not to be reflective. The treatment for antireflection is conducted generally by forming an antireflection film on the surface of a base material such as a lens. However, no antireflection film is known to be effective for prevention of fogging of optical members.

The fogging of the optical member such as lenses and mirrors is caused by deposition of moisture in a form of fine water droplets from the air onto the surface of the optical member when the temperature of the surface becomes lower than the dew point of the surrounding air, resulting in irregular reflection of light on the surface of the optical member. Therefore, the fogging can be avoided by preventing the condensation of water droplets onto the optical member. Conventionally, the antireflection film has a thickness of not more than 1 μm, and does not exhibit satisfactory non-fogging property.

SUMMARY OF THE INVENTION

An object of the present invention is to provide an antireflection film which is insoluble, wear-resistant, and weatherable, and is simultaneously non-fogging.

Another object of the present invention is to provide an optical member employing the non-fogging antireflection film.

A further object of the present invention is to provide a process for producing the non-fogging antireflection film.

According to an aspect of the present invention, there is provided a non-fogging antireflection film to be formed on a surface of a base material, comprising a composition obtained by polycondensation of a hydrolyzate of an inorganic alkoxide conducted at least in the presence of a polyacrylic acid compound.

According to another aspect of the present invention, there is provided an optical member having a non-fogging antireflection film formed on a surface of a base material, the non-fogging antireflection film comprising a composition obtained by polycondensation of a hydrolyzate of an inorganic alkoxide conducted at least in the presence of a polyacrylic acid compound.

According to a further aspect of the present invention, there is provided a process for producing a non-fogging antireflection film, comprising applying onto a surface of a base material a reaction solution containing at least one material selected from the group consisting of an inorganic alkoxide, a hydrolyzate of the inorganic alkoxide and a low molecular weight polycondensate of the hydrolyzate; a polyacrylic acid compound; and a catalyst for the polycondensation of the hydrolyzate; and heat-treating the applied film.

DESCRIPTION OF THE PREFERRED EMBODIMENT

The antireflection film of the present invention has an excellent non-fogging property, and simultaneously has properties of insolubleness, wear-resistance, and weatherability. The mechanism by which the non-fogging property is given to the antireflection layer of the present invention is considered as below. The polyacrylic acid incorporated in the antireflection film of the present invention is insoluble, although polyacrylic acids are generally soluble in water or an alcohol solvent. Therefore, in the polycondensation of the hydrolyzate of an inorganic alkoxide, the coexisting polyacrylic acid also reacts with it to form a composite polymer having both an inorganic moiety coming from the inorganic alkoxide and an organic moiety having hydrophilic groups coming from the polyacrylic acid. The hydrophilic groups are oriented effectively in the formed antireflection layer to absorb much moisture rapidly from the surrounding air.

The hydrolysis of an inorganic alkoxide and subsequent polycondensation is called sol-gel processing, in which the inorganic alkoxide is hydrolyzed and undergoes polycondensation in a solution to form a sol containing fine particles of an inorganic alkoxide or an inorganic hydroxide dispersed therein, and further allowed to react to form a gel. In the present invention, the antireflection film having an excellent non-fogging property is produced from the composition formed by conducting the above process in the presence of a polyacrylic acid compound.

The preferred inorganic alkoxide for forming the non-fogging antireflection film includes the compounds represented by Formula (I) and Formula (II) below:

$$M(OR)_a \qquad (I)$$

$$M(OR)_n(X)_{a-n} \qquad (II)$$

where M is an atom selected from the group consisting of Si, Al, Ti, Zr, Ca, Fe, V, Sn, Li, Be, B and P; R is an alkyl group; X is an alkyl group, a functional group-substituted alkyl group, or a halogen; a is a valence of M; and n is an integer of from 1 to a.

The group X above is preferably an alkyl group having a functional group of carbonyl, carboxyl, amino, vinyl, or epoxy.

Of the compounds represented by Formulas (I) and (II), widely used are those of n=a, namely compounds in which the alkoxy group only is bonded to M.

When M is Si, the valence a is 4, and the alkoxide may be represented by the formula $Si(OR^1)_4$, where $R^1$ is preferably an alkyl group of 1 to 4 carbons (hereinafter referred to as "lower alkyl"), and such an alkoxysilane includes $Si(OCH_3)_4$, and $Si(OC_2H_5)_4$.

When M is Al, the valence a is 3, and the alkoxide may be represented by the formula $Al(OR^2)_3$, where $R^2$ is preferably a lower alkyl. Such an aluminum alkoxide includes $Al(OCH_3)_3$, $Al(OC_2H_5)_3$, $Al(O\text{-}n\text{-}C_3H_7)_3$, $Al(O\text{-}iso\text{-}C_3H_7)_3$, and $Al(OC_4H_9)_3$. The above aluminum alkoxide is preferably used in a mixture with the above alkoxysilane. The use of the aluminum alkoxide improves the refractive index and the heat resistance of the resulting coating film. The amount of the aluminum alkoxide to be used is preferably not greater than 10 parts by weight, more preferably about 3 parts by weight based on 100 parts by weight of the alkoxysilane in view of prevention of gelation of the formed polymer and prevention of cracking of the formed antireflection film.

When M is Ti, the valence a is 4, and the alkoxide may be represented by the formula $Ti(OR^3)_4$, where $R^3$ is preferably a lower alkyl. Such a titanium alkoxide includes $Ti(O\text{—}CH_3)_4$, $Ti(O\text{—}C_2H_5)_4$, $Ti(O\text{—}C_3H_7)_4$, $Ti(O\text{—}C_4H_9)_4$, $Ti(O\text{-}iso\text{-}C_3H_7)_4$, and $Ti(O\text{-}t\text{-}C_4H_9)_4$. The titanium alkoxide may be used singly or in a mixture of two or more thereof. The titanium alkoxide is preferably used in a mixture with the above alkoxysilane. The use of the titanium alkoxide improves the refractive index and the ultraviolet resistance of the resulting coating film, and further improves remarkably the heat resistance of the base material. The amount of the titanium alkoxide to be used is preferably not greater than 3 parts by weight, more preferably about 1 part by weight based on 100 parts by weight of the alkoxysilane in view of the adhesiveness between the resulting antireflection film and the base material.

When M is Zr, the valence a is 4, and the alkoxide may be represented by the formula $Zr(OR^4)_4$, where $R^4$ is preferably a lower alkyl. Such a titanium alkoxide includes $Zr(O-CH_3)_4$, $Zr(O-C_2H_5)_4$, $Zr(O\text{-iso-}C_3H_7)_4$, $Zr(O\text{-t-}C_4H_9)_4$, and $Zr(O\text{-n-}C_4H_9)_4$. The zirconium alkoxide may be used singly or in a mixture of two or more thereof. The zirconium alkoxide is preferably used in a mixture with the above alkoxysilane. The use of the zirconium alkoxide improves the refractive index, the toughness and the heat resistance of the resulting coating film. The amount of the zirconium alkoxide to be used is preferably not greater than 5 parts by weight, more preferably about 3 parts by weight based on 100 parts by weight of the alkoxysilane in view of prevention of gelation of the formed polymer and the adhesiveness between the resulting antireflection film and the base material.

Other preferred alkoxides include $Ca(OC_2H_5)_2$, $Fe(OC_2H_5)_3$, $V(O\text{-iso-}C_3H_7)_4$, $Sn(O\text{-t-}C_4H_9)_4$, $Li(OC_2H_5)$, $Be(OC_2H_5)_2$, $B(OC_2H_5)_3$, $P(OC_2H_5)_3$, and $P(OCH_3)_3$.

Of the inorganic alkoxides represented by Formula (II), those of n<a, in which a group X other than an alkoxy group is attached to M, include compounds having as the group X halogen such as Cl or Br. The compound having halogen as the group X is hydrolyzed to have an OH group and is then allowed to undergo polycondensation of the compound in the same manner as in the case of the compound having the alkoxy group as described later. The group X may also be a simple alkyl group or an alkyl group having a functional substituent, where the alkyl group is usually of 1 to 15 carbons. Such a group is not hydrolyzed and remains as an organic moiety in the resulting polymer. The functional substituent includes carboxyl, carbonyl, amino, vinyl, and epoxy. Such a functional substituent is preferably used to raise the insolubility.

The compound of Formula (II) having a group X includes vinyltrimethoxysilane, vinyltriethoxysilane, γ-methacryloxypropyl-trimethoxysilane, γ-glycidoxypropyl-trimethoxysilane, and γ-aminopropyltrimethoxysilane.

A particularly preferred inorganic alkoxide is at least one selected from the group of $Si(OC_2H_5)_4$, $Al(O\text{-iso-}C_3H_7)_3$, $Ti(O\text{-iso-}C_3H_7)_4$, $Zr(O\text{-t-}C_4H_9)_4$, $Zr(O\text{-n-}C_4H_9)_4$, $Ca(OC_2H_5)_2$, $Fe(OC_2H_5)_3$, $V(O\text{-iso-}C_3H_7)_4$, $Sn(O\text{-t-}C_4H_9)_4$, $Li(OC_2H_5)_2$, $Be(OC_2H_5)_2$, $B(OC_2H_5)_3$, $P(OC_2H_5)_3$, and $P(OCH_3)_3$.

The polyacrylic acid compound employed in the present invention includes polyacrylic acid, polymethacrylic acid, polyacrylamide, and salts thereof (for example, potassium polyacrylate, and sodium polyacrylate). Particularly preferred are polyacrylic acid, and polymethacrylic acid.

The polyacrylic acid compound has a number-average molecular weight ranging preferably from 3,000 to 1,500,000, more preferably from 50,000 to 750,000.

The antireflection film of the present invention can be produced by applying, onto a surface of a base material, a reaction solution containing at least one material selected from an inorganic alkoxide, a hydrolyzate of the inorganic alkoxide and a low molecular weight polycondensate of the hydrolyzate; a polyacrylic acid compound; and a catalyst for the polycondensation of the hydrolyzate; and heat-treating the applied film of the reaction solution. The wording of "at least one material selected from the group consisting of an inorganic alkoxide a hydrolyzate of the inorganic alkoxide and a low molecular weight polycondensate of the hydrolyzate" means four cases below:

(1) The reaction solution is prepared by use of an inorganic alkoxide, and hydrolysis is allowed to proceed after the preparation of the reaction solution;

(2) The reaction solution is prepared by use of a hydrolyzate of an inorganic alkoxide having been formed by the hydrolysis;

(3) The reaction solution is prepared by use of a low molecular weight polycondensate having been obtained by partial polycondensation of a hydrolyzate of an inorganic alkoxide; and (4) The reaction solution is prepared by use of two or more of an inorganic alkoxide, a hydrolyzate thereof, and a low molecular weight polycondensate of the hydrolyzate.

In the case where the inorganic alkoxide is contained in the material for preparing the reaction solution, the hydrolysis of the inorganic alkoxide and the polycondensation of the hydrolyzate proceed in the presence of polyacrylic acid compound. The viscosity of the reaction solution rises with the progress of the polycondensation in the solution. Therefore, the reaction solution should be applied before the solution viscosity becomes excessively high.

The catalyst employed in the present invention includes acidic catalysts and basic catalysts. The acidic catalyst serves to catalyze hydrolysis of the inorganic alkoxide. Therefore, the acidic catalyst can be omitted when the inorganic alkoxide having been partly hydrolyzed is used or a low molecular weight oligomer obtained by partial polycondensation and having OH groups is used.

The acidic catalyst includes inorganic acids such as hydrochloric acid, sulfuric acid, and nitric acid, including also anhydrous inorganic acid such as hydrogen chloride gas. The acidic catalyst further includes organic acids and anhydrides thereof, including tartaric acid, phthalic acid, maleic acid, dodecylsuccinic acid, hexahydrophthalic acid, methyl endic acid, pyromellitic acid, benzophenonetetracarboxylic acid, dichlorosuccinic acid, chlorendic acid, phthalic anhydride, maleic anhydride, dodecylsuccinic anhydride, hexahydrophthalic anhydride, methyl endic anhydride, pyromellitic anhydride, benzophenonetetracarboxylic anhydride, dichlorosuccinic anhydride and chlorendic anhydride. The acidic catalyst is used in an amount ranging preferably from 0.01 to 0.5 part by weight, more preferably from 0.015 to 0.3 part by weight based on 100 parts by weight of the inorganic alkoxide. With the catalyst in an amount of less than 0.01 part by weight, the hydrolysis can be incomplete, whereas with the catalyst in an amount of more than 0.5 part by weight, the polycondensation can proceed to increase the viscosity before the application of the reaction solution.

The basic catalyst serves mainly to catalyze polycondensation of the hydrolyzate of the inorganic alkoxide. The basic catalyst is preferably a tertiary amine which is substantially insoluble in water and soluble in an organic solvent. Preferable basic catalyst includes N,N-dimethylbenzylamine, tripropylamine, tributylamine, and tripentylamine. Of these, N,N-dimethylbenzylamine is particularly preferred. The basic catalyst is used in an amount ranging preferably from 0.01 to 1 part by weight, more preferably 0.05 part by weight based on 100 parts by weight of the entire solutes in the reaction solution. The basic catalyst in an amount of more than 1 part by weight promotes the polycondensation excessively to make the reaction solution less soluble in the organic solvent mentioned below, and consequently tending to cause nonuniformity and low strength of the resulting coating film.

The organic solvent employed in the present invention is compatible with water, including methyl alcohol, ethyl alcohol, isopropyl alcohol, and butyl alcohol. The organic solvent is used with water. The organic solvent is used in an amount ranging preferably from 100 to 5000 parts by weight, more preferably about 3000 parts by weight based on 100 parts by weight of the entire solutes in the reaction solution.

The polyacrylic acid compound is used in an amount ranging preferably from 0.1 to 10 parts by weight based on 100 parts by weight of the entire solutes in the reaction solution. With the amount of the acrylic acid compound of less than 0.1 part by weight, the water absorption rate of the resulting composition tends to be lower, whereas, with the amount of the acrylic acid compound of more than 10 parts by weight, the hardness of the resulting composition tends to be lower.

The applied reaction solution is heat-treated and dried, for example, at a temperature of not lower than 80° C., preferably in the range of from 100 to 200° C. to obtain the high refraction film of the present invention. Further, components of the non-fogging film composition are mixed to prepare a clear coating solution. The coating solution is applied on the aforementioned high refractivity film, and heated and dried at a temperature of higher than 80° C., preferably in the range of preferably from 80 to 150° C. to form the non-fogging antireflection film of the present invention.

The non-fogging antireflection film of the present invention is preferably the one which is not fogged at all even after left standing at a low temperature of 0° C. and then transferred to high humidity atmosphere of not lower than 65% RH at 25° C.

The base material onto which the non-fogging antireflection film is applied includes lenses, mirrors, and prisms of optical instruments, and optical parallel-face plates such as filters.

The main composition of the non-fogging antireflection film of the present invention is obtained by a sol-gel reaction conducted in the presence of a polyacrylic acid compound. Therefore, the composition can be any of a polycondensate which is obtained by deprotonation of OH group of a hydrolyzate from the inorganic alkoxide, causing polycondensation to take place; the aforementioned composite polymer which is formed by crosslinking reaction of the polyacrylic acid compound with OH groups of the polycondensate; a reaction product which is formed by reaction of the hydrolyzate of the inorganic alkoxide and the polyacrylic acid compound; and a reaction product which is formed by reaction of three substances of the above-mentioned polycondensate, the hydrolyzate, and the polyacrylic acid compound.

Generally, a thin film for light reflection prevention of optical lenses or the like is formed on the surface thereof in a single layer or a multiple layer, and the refractivity and the thickness of the film are decided as below.

In the case of a single layer film, the refractive index is adjusted to satisfy the relation of $n_s > n_f$, where $n_s$ is the refractive index of the base material and $n_f$ is the refractive index of the thin film formed on the surface of the base material. Ideally, $n_f = \sqrt{(n_s)}$. The thickness of the thin film is ideally selected to satisfy the relation:

$$n_f \cdot d_f = \lambda/4 \text{ or } 3\lambda/4$$

where $d_f$ is the thickness of the thin film, and $n_f$ is as defined above, and $\lambda$ is a wavelength of light.

In the case of a multiple layer film, the refractive indexes are selected to satisfy the relation of $n_2 > n_s > n_f$, where $n_2$ is the refractive index of the second layer next to the outermost layer. Ideally, the film thickness $d_f$ of the outermost layer and the film thickness $d_2$ of the second layer from the outermost layer satisfy the following relations:

$$n_f \cdot d_f = \lambda/4 \text{ or } 3\lambda/4$$

$$n_2 \cdot d_2 = \lambda/4 \text{ or } \lambda/2$$

When $n_2 \cdot d_2 = \lambda/4$, the light transmittance is maximum at the specific wavelength $\lambda$. When $n_2 \cdot d_2 = \lambda/2$, the light transmittance increases over a broad wavelength range.

The antireflection film thus prepared imparts a non-fogging property and an antireflection property to the surface of the base material. The formed antireflection film is insoluble in water and organic solvents, and has high surface hardness, high wear resistance, and high weatherability.

The film thickness is preferably in the range below practically:

$$0.05\lambda < n_f \cdot d_f < 1.5\lambda$$

$$0.05\lambda < n_2 \cdot d_2 < 1.5\lambda$$

This antireflection film may be formed by a vapor phase process to form a laminate with the non-fogging film having a lower refractive index on the surface side.

To improve the adhesion strength between the base material and the non-fogging antireflection film, an undercoat layer, such as for example a layer of silane coupling agent may be formed effectively on the surface of the base material. The silane coupling agent for that purpose includes, for example, vinyltrichlorosilane, vinyltriethoxysilane, γ-(methacryloyloxypropyl)trimethoxysilane, γ-glycidyloxypropyltrimethoxysilane, γ-aminopropyltriethoxysilane, and γ-mercaptopropyltrimethoxysilane.

The present invention is described more specifically by reference to Examples.

EXAMPLE 1

Polyacrylic acid was dissolved in methanol at the ratio (parts by weight respectively) shown as components (a) in Table 1, and the resulting solution was stirred at an ordinary temperature of 25° C. for 3 minutes. Separately, as shown as component (b) in Table 1 (parts by weight respectively), aluminum isopropoxide, hydrochloric acid, water, and ethanol were mixed to form a solution, and thereto ethyl silicate 40 (Colcoat Co., Ltd.), silane coupling agent SH6040 (Toray Dow Corning Co.), and N,N-dimethylbenzylamine were added, and the resulting mixture was stirred at an ordinary temperature of 25° C. for 10 minutes. The resulting solution of components (b) was added to the aforementioned solution of components (a), and the combined solution was stirred at an ordinary temperature of 25° C. for 2 minutes to prepare a clear coating solution.

A lens having a refractive index of 1.83 was dipped into the coating solution, and was pulled out at a pulling-up rate of 30 mm per minute to form a coating film, and was heated and dried at 150° C. for 10 minutes.

The light transmittance of the coated lens was 90% at wavelength of 550 nm as measured by a recording spectrophotometer U-4000 (Hitachi, Ltd.).

The refractive index of the coating film on the lens was 1.46, and the optical thickness (geometrical thickness multiplied by the refractive index) was 0.5 μm.

The lens was kept at 0° C. in a thermo-hygrostat for 30 minutes, and then transferred to another thermo-hygrostat held at 25° C. and 75% RH. As the result, fogging was not observed at all.

TABLE 1

(Non-fogging film)

| | (% by weight) |
|---|---|
| (a) | |
| Polyacrylic acid | 19.73 |
| (aqueous 25% solution, number-average molecular weight: 300,000) | |
| Methanol | 78.91 |
| (b) | |
| Tetramer of tetraethoxysilane | 0.30 |
| (Trade name: Ethyl silicate 40, Colcoat Co., Ltd.) | |
| Silane coupling agent | 0.46 |
| (Trade name: SH6040, Toray Dow Corning Co.) | |
| 2N—HCl | 0.01 |
| Aluminum isopropoxide | 0.05 |
| HCl (35%) | 0.04 |
| Water (H$_2$O) | 0.09 |
| Ethanol | 0.40 |
| N,N-dimethylbenzylamine | 0.01 |
| | 100.00 |

Comparative Example 1

The light transmittance of the noncoated lens with the refractivity index of 1.83 employed in Example 1 was measured in the same manner as in Example 1, and found to be 82% at the measurement wavelength of 550 nm.

This lens was kept at 0° C. in a thermo-hygrostat for 30 minutes, and then transferred to another thermo-hygrostat held at 25° C. and 75% RH. Thereby the lens was found to be fogged.

Comparative Example 2

A clear coating solution was prepared by mixing components (a) and components (b) of Table 1 in Example 1 and stirring the resulting methanol solution at 25° C. for 10 minutes in the same manner as in Example 1 except that the polyacrylic acid (25% solution) in components (a) was not used. Therein a lens of the refractive index of 1.83 was dipped, and the lens was coated and dried in the same manner as in Example 1. The coated lens was kept at 0° C. in a thermo-hygrostat for 30 minutes, and transferred to another thermo-hygrostat held at 25° C. and 75 %RH. Thereby fogging of the lens occurred immediately.

EXAMPLE 2

Titanium tetraisopropoxide, hydrochloric acid, and ethanol were mixed at the ratio (parts by weight respectively) shown as components (a) in Table 2 with stirring at an ordinary temperature of 25° C. for 3 minutes. Separately, as shown as component (b) in Table 2 (parts by weight respectively), silane coupling agent SH6040 (Toray Dow Corning Co.), 2N hydrochloric acid, N,N-dimethylbenzylamine, and water were mixed. The resulting solution of components (b) was added to the aforementioned solution of components (a), and the combined solution was stirred at an ordinary temperature for 2 minutes to prepare a clear coating solution.

A lens having a refractive index of 1.58 was dipped into the coating solution, and was pulled out at a pulling-up rate of 30 mm per minute to form a coating film, and was heated and dried at 150° C. for 10 minutes.

The refractive index of the coating film on the lens was 1.7, and the optical thickness was 0.6 μm.

TABLE 2

(Second layer next to outermost layer)

| | (% by weight) |
|---|---|
| (a) | |
| Titanium tetraisopropoxide | 7.62 |
| Ethanol | 89.19 |
| HCl (35%) | 0.05 |
| (b) | |
| Silane coupling agent (Trade name: SH6040) | 2.83 |
| 2N—HCl | 0.19 |
| Water (H$_2$O) | 0.02 |
| N,N-dimethylbenzylamine | 0.10 |
| | 100.00 |

Subsequently, polyacrylic acid was dissolved in methanol at the ratio (parts by weight respectively) shown as components (a) in Table 3, and the resulting solution was stirred at an ordinary temperature of 25° C. for 3 minutes. Separately, as shown as component (b) in Table 3 (parts by weight respectively), aluminum isopropoxide, hydrochloric acid, water, and ethanol were mixed to form a solution, and thereto ethyl silicate 40 (Colcoat Co., Ltd.), silane coupling agent SH6040 (Toray Dow Corning Co.), and N,N-dimethylbenzylamine were added and the resulting mixture was stirred at an ordinary temperature of 25° C. for 10 minutes. The resulting solution of components (b) was added to the aforementioned solution of components (a), and the combined solution was stirred at an ordinary temperature of 25° C. for 2 minutes to prepare a clear coating solution.

A lens having the inner layer (second layer next to outermost layer) formed thereon was dipped into the coating solution, and was pulled out at a pulling-up rate of 30 mm per minute to form a coating film, and was heated and dried at 150° C. for 10 minutes.

TABLE 3

(Outermost layer: same as in Example 1)

| | (% by weight) |
|---|---|
| (a) | |
| Polyacrylic acid | 19.73 |
| (aqueous 25% solution) | |
| Methanol | 78.91 |
| (b) | |
| Tetraethoxysilane | 0.30 |
| Silane coupling agent | 0.46 |
| 2N—HCl | 0.01 |
| Aluminum isopropoxide | 0.05 |
| HCl (35%) | 0.04 |
| Water (H$_2$O) | 0.09 |
| Ethanol | 0.40 |
| N,N-dimethylbenzylamine | 0.01 |
| | 100.00 |

The light transmittance of the lamination-coated lens was 95% at wavelength of 550 nm as measured by a recording spectrophotometer U-4000 (Hitachi, Ltd.).

The lens was kept at 0° C. in a thermo-hygrostat for 30 minutes, and then transferred to another thermo-hygrostat held at 25° C. and 75% RH. As the result, fogging was not observed at all.

EXAMPLE 3

A polyacrylic acid solution in methanol was prepared in the same manner as in Example 1 except that the polyacrylic acid in component (a) in Table 1 was replaced by another polyacrylic acid having a number-average molecular weight of 150,000. The resulting solution was stirred at an ordinary temperature of 25° C. for 3 minutes. Thereto, the preliminarily prepared solution of components (b) in Table 1 was mixed in the same manner as in Example 1 to obtain a clear coating solution.

A piece of slide glass was dipped into the coating solution, and pulled up at a rate of 30 mm per minute to form a coating film. The coating film was heated and dried at 150° C. for 10 minutes to obtain an antireflection film.

The coated slide glass was kept at 0° C. in a thermo-hygrostat for 30 minutes, and then transferred to another thermo-hygrostat held at 25° C. and 75% RH. As the result, fogging of the slide glass was not observed at all.

EXAMPLE 4

Polymethacrylic acid was dissolved in methanol at the ratio (parts by weight respectively) shown as components (a) in Table 4, and the solution was stirred at an ordinary temperature of 25° C. for 3 minutes. Separately, as shown as component (b) in Table 4 (parts by weight respectively), aluminum isopropoxide, hydrochloric acid, water, and ethanol were mixed to form a solution, and thereto ethyl silicate 40 (Colcoat Co., Ltd.), silane coupling agent SH6040 (Toray Dow Corning Co.), and N,N-dimethylbenzylamine were added and the resulting mixture was stirred at an ordinary temperature of 25° C. for 10 minutes. The resulting solution of components (b) was added to the aforementioned solution of components (a), and the combined solution was stirred at an ordinary temperature of 25° C. for 2 minutes to prepare a clear coating solution.

A piece of slide glass was dipped into the above coating solution, and was pulled out at a pulling-up rate of 30 mm per minute to form a coating film. The coating film was heated and dried at a temperature of from 155 to 160° C. for 10 minutes to form an antireflection film.

The slide glass was kept at 0° C. in a thermo-hygrostat for 30 minutes, and then transferred to another thermo-hygrostat held at 25° C. and 75 %RH. As the result, fogging of the slide glass was not observed at all.

TABLE 4

| (Non-fogging film) | |
|---|---|
| | (% by weight) |
| (a) | |
| Polymethacrylic acid | 20.04 |
| (aqueous 25% solution, | |
| number-average molecular weight: 130,000) | |
| Methanol | 78.60 |
| (b) | |
| Ethyl silicate 40 | 0.30 |
| (Trade name: Colcoat Co., Ltd.) | |
| Silane coupling agent | 0.46 |
| (Trade name: SH6040, Toray Dow Corning Co.) | |
| 2N—HCl | 0.01 |
| Aluminum isopropoxide | 0.05 |

TABLE 4-continued

| (Non-fogging film) | |
|---|---|
| | (% by weight) |
| HCl (35%) | 0.04 |
| Water (H$_2$O) | 0.09 |
| Ethanol | 0.40 |
| N,N-dimethylbenzylamine | 0.01 |
| | 100.00 |

What is claimed is:

1. A non-fogging antireflection film having a thickness $d_f$ and a refractive index $n_f$, formed on a surface of a base material having a refractive index $n_s$, said film comprising a composition obtained by polycondensation of a hydrolyzate of an inorganic alkoxide conducted at least in the presence of a polyacryic acid compound, wherein the non-fogging antireflection film is an outermost film and the refractive indexes of the base material and the non-fogging antireflection film and the thickness of the non-fogging antireflection film satisfy the relationships below:

$$n_s > n_f \text{ and } 0.05\lambda < n_f d_f < 1.5\lambda,$$

where λ is a wavelength of light (ranging from 400 to 830 nm).

2. The non-fogging antireflection film according to claim 1, wherein hydrolysis of the inorganic alkoxide and the polycondensation of the hydrolyzate of the inorganic alkoxide are conducted in the presence of a polyacrylic acid compound.

3. The non-fogging antireflection film according to claim 1, wherein the inorganic alkoxide is at least one of the compounds represented by Formula (I) and Formula (II):

$$M(OR)_a \qquad (I)$$

$$M(OR)_n(X)_{a-n} \qquad (II)$$

where M is an atom selected from the group consisting of Si, Al, Ti, Zr, Ca, Fe, V, Sn, Li, Be, B and P; R is an alkyl group; X is an alkyl group, a functional group-substituted alkyl group, or a halogen; a is a valence of M; and n is an integer of from 1 to a.

4. The non-fogging antireflection film according to claim 1, wherein the inorganic alkoxide is at least one selected from the group consisting of Si(OC$_2$H$_5$)$_4$, Al(O-iso-C$_3$H$_7$)$_3$, Ti(O-iso-C$_3$H$_7$)$_4$, Zr(O-t-C$_4$H$_9$)$_4$, Zr(O-n-C$_4$H$_9$)$_4$, Ca(OC$_2$H$_5$)$_2$, Fe(OC$_2$H$_5$)$_3$, V(O-iso-C$_3$H$_7$)$_4$, Sn(O-t-C$_4$H$_9$)$_4$, Li(OC$_2$H$_5$), Be(OC$_2$H$_5$)$_2$, B(OC$_2$H$_5$)$_3$, P(OC$_2$H$_5$)$_3$, and P(OCH$_3$)$_3$.

5. The non-fogging antireflection film according to claim 1, wherein the polyacrylic acid compound is at least one selected from polyacrylic acid, polymethacrylic acid, and salts thereof.

6. The non-fogging antireflection film according to claim 1, wherein the inorganic alkoxide is at least one of the compounds represented by Formula (I) and Formula (II):

$$M(OR)_a \qquad (I)$$

$$M(OR)_n(X)_{a-n} \qquad (II)$$

where M is an atom selected from the group consisting of Si, Al, Ti, Zr, Ca, Fe, V, Sn, Li, Be, B and P; R is an alkyl group; X is an alkyl group, a functional group-substituted alkyl group, or a halogen; a is a valence of M; and n is an integer of from 1 to a; and the polyacrylic acid compound is at least one selected from polyacrylic acid, polymethacrylic acid, and salts thereof.

7. The non-fogging antireflection film according to claim 1, wherein the base material is selected from lenses, optical parallel-face plates, mirrors, and prisms.

8. A non-fogging antireflection film formed on a surface of a base material having a refractive index $n_s$, comprising an outermost layer having a refractive index $n_f$ and a thickness $d_f$, and a second layer next to the outermost layer having a refractive index $n_2$ and a thickness $d_2$, said outermost layer comprising a composition obtained by polycondensation of a hydrolyzate of an inorganic alkoxide conducted at least in the presence of a polyacrylic acid compound, wherein the refractive indexes and the thicknesses of the two layers satisfy the relationships below:

$n_2 > n_s > n_f$, $0.05\lambda < n_f \cdot d_f < 1.5\lambda$, and $0.05\lambda < n_2 \cdot d_2 < 1.5\lambda$, where $\lambda$ is a wavelength of light (ranging from 400 to 830 nm).

9. The non-fogging antireflection film according to claim 8, wherein the second layer next to the outermost layer is formed from a inorganic alkoxide that includes at least one of the compounds represented by Formula (I) and Formula (II):

$M(OR)_a$                                                (I)

$M(OR)_n(X)_{a-n}$                          (II)

where M is an atom selected from the group consisting of Si, Al, Ti, Zr, Ca, Fe, V, Sn, Li, Be, B and P; R is an alkyl group; X is an alkyl group, a functional group-substituted alkyl group, or a halogen; a is a valence of M; and n is an integer of from 1 to a.

10. The non-fogging antireflection film according to claim 9, wherein the inorganic alkoxide is at least one selected from the group consisting of $Si(OC_2H_5)_4$, $Al(O\text{-}iso\text{-}C_3H_7)_3$, $Ti(O\text{-}iso\text{-}C_3H_7)_4$, $Zr(O\text{-}t\text{-}C_4H_9)_4$, and $ZR(O\text{-}n\text{-}C_4H_9)_4$.

11. The non-fogging antireflection film according to claim 8, wherein the base material is selected from lenses, optical parallel-face plates, mirrors, and prisms.

* * * * *